United States Patent [19]

Buckley et al.

[11] 4,215,022
[45] Jul. 29, 1980

[54] ISOBUTYLENE CYCLODIOLEFIN COPOLYMERS AND TERPOLYMERS

[75] Inventors: Donald J. Buckley, Plainfield; Warren A. Thaler, Matawan, both of N.J.; Joseph P. Kennedy, Akron, Ohio

[73] Assignee: Exxon Research & Engineering Co., Florham Park, N.J.

[21] Appl. No.: 952,241

[22] Filed: Oct. 16, 1978

Related U.S. Application Data

[60] Division of Ser. No. 803,596, Jun. 6, 1977, which is a continuation-in-part of Ser. No. 631,444, Nov. 13, 1975, Pat. No. 4,031,300, which is a continuation-in-part of Ser. No. 457,109, Apr. 1, 1975, Pat. No. 3,928,297, which is a continuation-in-part of Ser. No. 151,108, Jun. 8, 1971, Pat. No. 3,808,177.

[51] Int. Cl.² .................................................. C08F 8/34
[52] U.S. Cl. .............................. 260/5; 260/31.8 DR; 260/33.6 AQ; 260/42.47; 525/343
[58] Field of Search ............... 260/5, 31.8 DR, 42.47, 260/33.6 AQ, 888, 889; 526/36, 343

[56] References Cited

U.S. PATENT DOCUMENTS

| 2,521,359 | 9/1950 | Garber | 260/85.3 |
| 3,080,337 | 3/1963 | Minckler et al. | 260/45.5 |
| 3,356,661 | 12/1967 | Coleman | 526/135 |
| 3,808,177 | 4/1974 | Thaler et al. | 260/80.7 |
| 3,928,297 | 12/1975 | Thaler et al. | 260/85.3 A |
| 4,031,300 | 6/1977 | Thaler et al. | 526/308 |

*Primary Examiner*—Stanford M. Levin
*Attorney, Agent, or Firm*—Richard E. Nanfeldt

[57] ABSTRACT

Substantially gel free, high molecular weight, high unsaturation copolymers of isobutylene and cyclo-conjugated dienes having a number-average molecular weight of about 30,000 to about 90,000 and a mole % of unsaturation of about 5 to about 45 are prepared by a polymerization in a homogeneous phase, wherein the catalyst which is a hydrocarbyl aluminum dihalide or aluminum halide type catalyst dissolved in an aliphatic type solvent is added to a mixture of the isobutylene, cyclo-conjugated diene, and an aliphatic cosolvent and the polymerization reaction is carried out at a temperature of about $-80°$ to about $-110°$ C.

27 Claims, 10 Drawing Figures

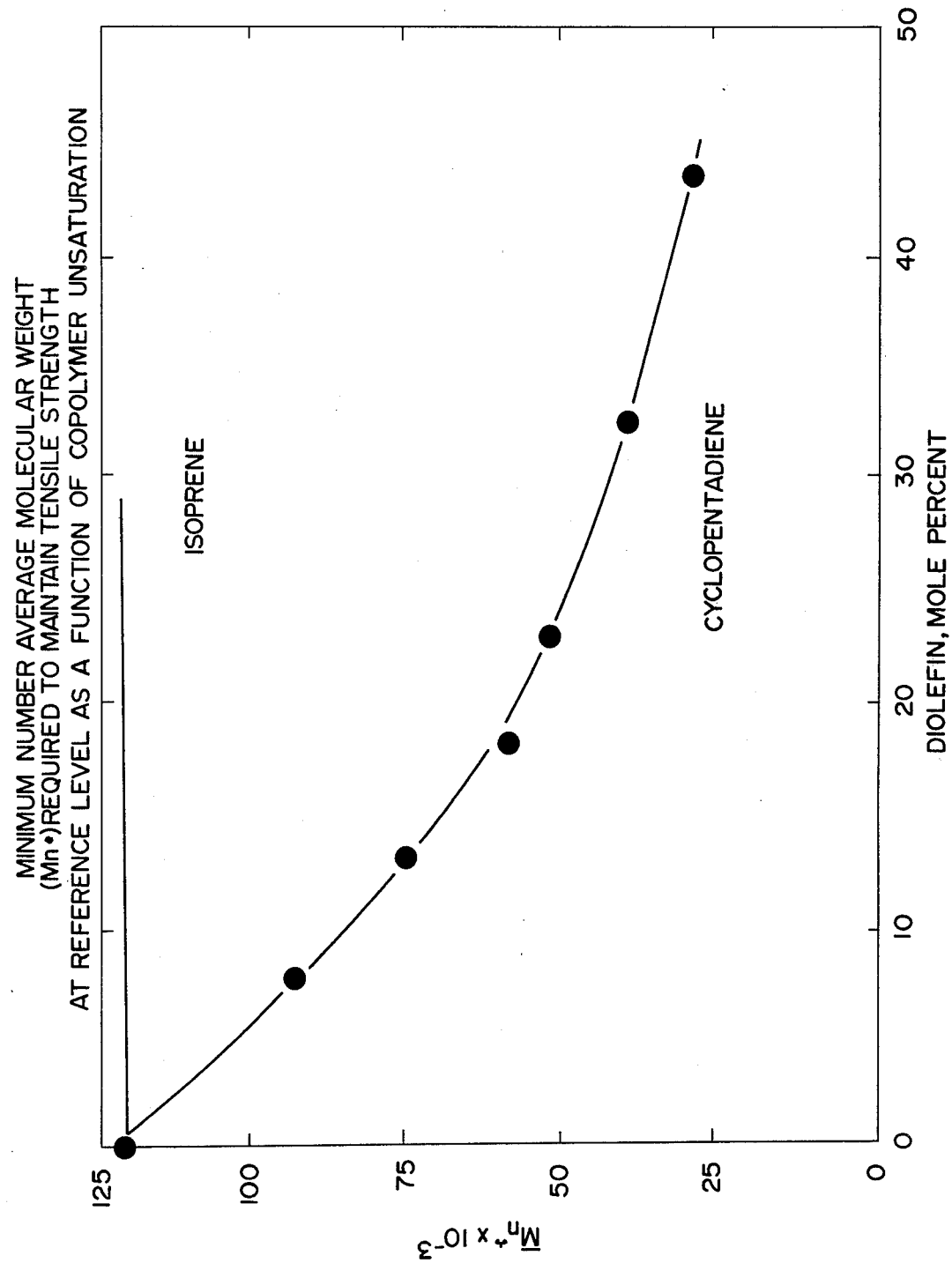

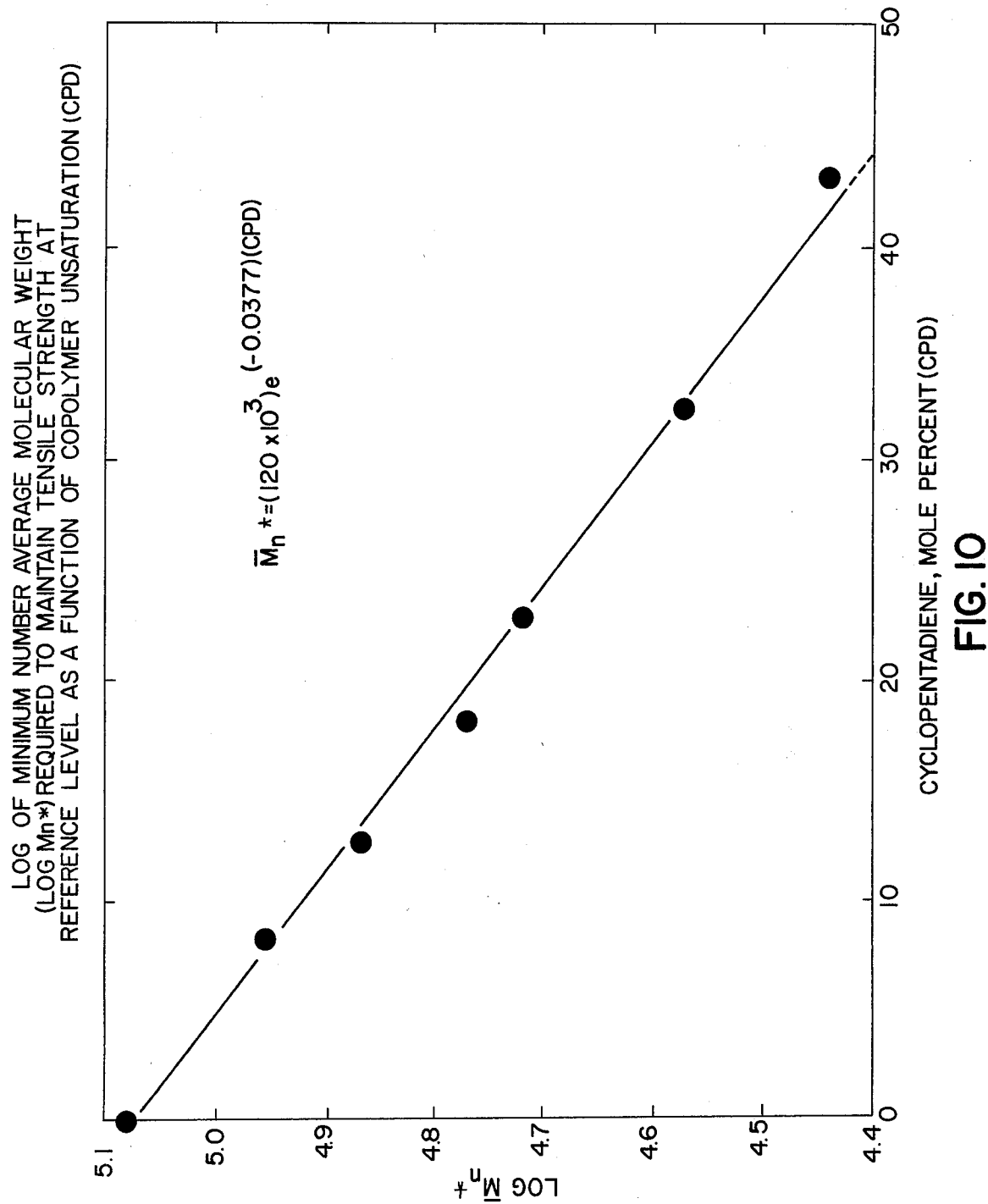

ISOBUTYLENE CYCLODIOLEFIN COPOLYMERS AND TERPOLYMERS

CROSS REFERENCE TO RELATED APPLICATIONS

This is a division, of application Ser. No. 803,596, filed June 6, 1977, which application is a continuation-in-part of copending application Ser. No. 631,444 filed Nov. 13, 1975, now U.S. Pat. No. 4,031,300, which is a Continuation-In-Part application, Ser. No. 457,109, filed Apr. 1, 1975, now U.S. Pat. No. 3,928,297, which is a Continuation-In-Part application of Ser. No. 151,138, filed June 8, 1971, which is now U.S. Pat. No. 3,808,177.

FIELD OF THE INVENTION

Substantially gel-free, high unsaturation copolymers of isobutylene and cycloconjugated dienes having a number average molecular weight of about 30,000 to about 90,000 and a mole % of unsaturation of about 5 to about 45 are prepared by a polymerization in a homogeneous phase, wherein the catalyst which is a hydrocarbyl aluminum dihalide or aluminum halide type catalyst dissolved in an aliphatic type solvent is added to a mixture of the isobutylene, cycloconjugated diene, and an aliphatic cosolvent and the polymerization reaction is carried out at a temperature of about −80° to about −110° C.

BACKGROUND OF THE INVENTION

Polymers and copolymers of isobutylene are well known in the art. In particular, copolymers of isobutylene with conjugated multiolefins have found wide acceptance in the rubber field. These polymers are generally termed in the art "Butyl rubber". The preparation of Butyl rubber is described in U.S. Pat. No. 2,356,128, which is incorporated herein by reference.

The term "Butyl rubber" as employed in the specification is intended to include copolymers made from the polymerization of a reaction mixture comprising an isoolefin having about 4 to 7 carbon atoms, e.g. isobutylene and a conjugated multiolefin having about 4 to 14 carbon atoms, e.g. isoprene. Although these copolymers are said to contain about 0.2 to about 15% combined multiolefin, in practice the Butyl rubber polymers of commerce contain about 0.6 to about 4.5 wt. % of multiolefin; more generally, about 1.0 to about 2 mole %, the remainder of the polymer being comprised of the isoolefin component.

Efforts to prepare isoolefin-multiolefin polymers of higher unsaturation have met with varying degrees of success. Where substantially gel-free polymers have been prepared containing more than about 5% multiolefin, the polymers have been of low number average molecular weight. This has been true even where these polymers had high viscosity average molecular weights. In general, however, the products formed by prior art processes are either high in gel content or low in number average molecular weight and of little utility. In order to have practical commercial utility as a synthetic Butyl rubber, the isobutylene-isoprene copolymers must be substantially gel-free and have a number average molecular weight of at least 120,000.

Multiolefins are known to be molecular weight depressants and catalyst poisons; futhermore, increased unsaturation in the polymer backbone provides potential sites for branching and eventual gelation. Hence, attempts to prepare more highly unsaturated isoolefin-multiolefin copolymers by prior art methods have resulted in the formation of either low molecular weight or resinous crosslinked polymers which have little or no commercial utility as elastomers.

Although some commercial elastomers such as styrene butadiene rubber or EPDM may contain as much as 2 to 9% gel, isobutylene copolymers of commerce are substantially gel-free. The isobutylene copolymers may contain as much as 2% gel but preferably contain less than 1%.

There are numerous patents and literature disclosures which generally disclose polymers and copolymers of isobutylene the copolymers purportedly having from about 0.5 to 98% unsaturation. Where the prior art copolymers are high in unsaturation, however, they are either low in number average molecular weight or resinous.

Japanese Patent JA27416/68 published Nov. 26, 1978 teaches a process for preparing copolymers of conjugated diene compounds with isobutylene which contain "a large amount of conjugated diene compounds" using catalysts prepared by reacting (1) mercuric halide, aluminum halide or hydrogen halide, (2) zirconium halide and (3) aluminum metal in the presence of an aromatic compound, e.g. benzene. These products are described as copolymers which are "rubbery substances when the isobutylene is high and are resinous when the isobutylene content is low". The resinous properties result from gelation and crosslinking of the polymer during its preparation. These gelled and crosslinked products have little utility as rubbers. The products of lower unsaturation, i.e. high isobutylene content rubbers, are of the conventional Butyl rubber type.

Japanese Patent JA27417/68 published Nov. 26, 1968 teaches a method for preparing copolymers of dienes and isoolefins containing about 0.1 to about 40 wt. %, preferably about 0.5 to 5 wt. % of diene. The polymers are prepared using a catalyst derived from (1) metal oxides of the general formula $M_xO_y$, wherein M is nickel or cobalt and $1 < y/x \leq 1.5$, and (2) aluminum halide. Again, the low unsaturation polymers are the conventional Butyl rubbers whereas the highly unsaturated materials are either low in number average molecular weight or are gelled polymers.

U.S. Pat. No. 3,356,661 teaches a method for preparing copolymers of isobutylene and butadiene-1,3 hydrocarbons, for example copolymers of isoprene and isobutylene. The copolymers produced by the process disclosed are either lower molecular weight, i.e. less than 100,000 viscosity average molecular weight or gelled polymers.

U.S. Pat. No. 3,165,503 teaches a method for polymerizing butadiene-1,3 hydrocarbons, e.g., isoprene. The invention of this patent is directed primarily towards the preparation of polyisoprene. However, copolymers of isoprene and isobutylene are disclosed. The preferred copolymers are said to contain from about 1 to 50 wt. % of butadiene-1,3 hydrocarbon units. Hydrocarbon copolymers of isoolefin and conjugated dienes prepared by the method taught by the patentee are found to be low in number average molecular weight or gelled polymers.

U.S. Pat. No. 3,466,268 and its parent counterpart, U.S. Pat. No. 3,357,960 disclose a butadiene-isobutylene copolymer and a process for preparing said copolymer. The invention disclosed is a method of improving butadiene polymers by incorporating in the structure varying amounts of isobutylene. Preferably, the amount of isobutylene incorporated is said to be about 2 to 40 wt. %. The polymers disclosed are generally low in number average molecular weight. Substitution of isoprene for butadiene results in highly crosslinked copolymers which have little utility.

U.S. Pat. No. 2,772,255 (Br. Pat. No. 744,514) discloses a method for preparing high molecular weight Butyl rubbers. In general, the polymers which are prepared are conventional Butyl rubbers having less than 3 mole % unsaturation. Attempts to produce Butyl rubber type polymers having unsaturation in excess of 5 mole % unsaturation result in products which either are low in number average molecular weight or are gelled and highly crosslinked.

High unsaturation isobutylene-isoprene copolymers have been prepared (see, for example, U.S. Pat. No. 3,242,147 incorporated herein by reference). Although these polymers are purportedly high in viscosity average molecular weight, the number average molecular weights are low. Hence, the products have little commercial significance.

Previous theoretical postulates and experience has indicated that unlike plastics, elastomers require a high number average molecular weight in order to realize desirable levels in physical properties. For example, tensile strength for elastomers is critically dependent on number average molecular weight since these polymers are used well above their glass transition temperature and are generally amorphous.

In contrast to elastomers, amorphous thermoplastics are used well below their glass transition temperature and it is molecular associations which gives them their structural integrity. As a result, number average molecular weights in the order of 20,000 to 70,000 are adequate for commercial utility.

Elastomers, on the other hand, obtain their structural integrity from a crosslinked network. Perfection of this network is directly dependent on the length of the polymer molecules from which the network is derived. Number average molecular weight ($\overline{M}n$) is a measure of the length of the molecules. Viscosity or weight average molecular weights are misleading measurements since their numerical value is greatly affected by small variations in the distribution of the higher molecular weight fractions. Hence, polymers of low number average molecular weight may have high viscosity average molecular weight as a result of disproportionate distribution of the high molecular weight fraction. Highly branched polymers can have inadequate elastomeric properties even at high number average molecular weight since $\overline{M}n$ is no longer a simple measure of molecular length.

The importance of number average molecular weight on tensile strength has long been theorized (see, for example, Flory, p. 5, *Ind. Eng. Chem.*, 38, 417 (1946), incorporated herein by reference. Flory showed that for vulcanizates of low unsaturation elastomeric copolymers of isobutylene-isoprene tensile strength increased rapidly as the number average molecular weight was increased beyond a minimum value (i.e. 100,000) then approaches an asymptotic limit.

For economic reasons, oil extendability is an essential characteristic of a commercial elastomer for almost all major uses. The tensile strength of Butyl rubber vulcanizates is reduced by the addition of oil, and to retain the original tensile strength of the undiluted composition it is necessary to increase the number average molecular weight. Oil extension also improved the low temperature properties of Butyl inner-tubes and when this phenomenon was discovered, it was necessary to develop higher molecular weight polymers to accomodate the added oil. See, for example, Buckley et. al., *Ind. Eng. Chem.*, 42, 2407 (1950).

This finding resulted in the rapid adoption by industry of the high molecular weight type of Butyl GR-1-18 with Mooney viscosity greater than 71 (212° F.). These materials generally have number average molecular weights of 150,000 or greater. In contrast, the previously used polymers which have number average molecular weights of less than 120,000 with Mooney viscosity specification of 38-49 (212° F.) were limited to applications which did not require oil extension, and today represents a very minor portion of the Butyl rubber market having been supplanted almost entirely by the higher molecular weight Butyl rubbers.

Although it has been postulated that higher unsaturation copolymers of isobutylene would be attractive polymers, useful polymers have not been available since the prior art methods are not capable of producing highly unsaturated, e.g., at least 5 mole % to about 45 mole %, gel free isobutylene copolymers of sufficiently high number average molecular weight, e.g., at least 120,000. Hence, the prior art isobutylene-conjugated diene copolymers offered commercially are low in unsaturation, e.g., 1-2.5 mole %.

U.S. Pat. No. 3,808,177 and U.S. Ser. No. 631,444 which are the parent cases of this Continuation-in-Part application described a process for preparing copolymers of isobutylene-isoprene above 120,000—$\overline{M}n$; copolymers of isobutylene-cyclopentadiene above 120,000—$\overline{M}n$; and terpolymers of isobutylene isoprene cyclopentadiene above 120,000, wherein these copolymers and terpolymers have a mole percent unsaturation of at least about 5%. These patents clearly theorize that to be of commercial quality, the elastomer must be substantially gel-free and have a number average molecular weight ($\overline{M}n$) of about at least about 120,000.

This theory is perfectly valid for isobutylene copolymerized with a straight chain conjugated diene such as isoprene. In fact, the physical properties and ability to extend with oil are adversely affected as the $\overline{M}n$ decreases below 100,000. However, quite unexpectedly, the physical properties and oil extendability of a copolymer isobutylene cyclopentadiene or a terpolymer of isobutylene isoprene cyclopentadiene are maintained at a high value as the $\overline{M}n$ is decreased if at the same time the cyclopentadiene content is increased. Thus, increasing cyclopentadiene content can offset the effects of lowered $\overline{M}n$ values within the limits set forth in FIG. X.

Therefore, quite unexpectedly we have been able to produce high performance synthetic rubbers of copolymers of isobutylene-cyclopentadiene and terpolymers of isobutylene isoprene cyclopentadiene, wherein the copolymers and terpolymers have an $\overline{M}n$ of about 30,000 to about 90,000 preferably the copolymers and terpolymers have an $\overline{M}n$ of about 50,000 to about 90,000, more preferably about 60,000 to 90,000 and most preferably 70,000 to 90,000.

The manufacture of these materials can be accomplished with significant process economies making these products particularly valuable when they are suitable substitutes for high molecular weight products.

Although the isobutylene-conjugated diene copolymers commerce have good ozone resistance, these polymers are still subject to ozone cleavage, since the site of unsaturation is in the polymer backbone. It has been postulated that isobutylene copolymers having unsaturation on the side chain rather than the backbone would be highly resistant to ozone attack. Attempts to produce useful polymers by previous art using cyclopentadiene and methylcyclopentadiene as the diene comonomer have been notably unsuccessful.

Isobutylene cyclodiolefin copolymers of the prior art have been too low in molecular weight to be of commercial significance. Some improvement in molecular weight has been accomplished by copolymerizing isobutylene with minor amounts of cyclopentadiene (CPD) or methylcyclopentadiene (MCPD) along with other monomers including crosslinking agents such as divinyl benzene. The resulting products are somewhat improved terpolymers or tetrapolymers resulting from the linking of the low molecular weight isobutylene-CPD chains into two dimensional highly branched polymers. Such polymers however, have inferior physical properties as compared to the Butyl rubbers of commerce and hence have not gained acceptance.

A review of the art illustrates the problems encountered where attempts were made to prepare copolymers of isobutylene and cyclopentadiene (CPD) or isobutylene and methylcyclopentadiene. For example, U.S. Pat. No. 2,577,822, and 3,511,821 incorporated herein by reference, teaches the need for the addition of divinyl benzene in order to compensate for the deleterious effect of CPD and MCPD on molecular weight.

U.S. Pat. No. 3,080,337, incorporated herein by reference, teaches the addition of isoprene as a third monomer to help stabilize the polymerization but the resulting products are low in unsaturation and have poor physical properties. Others have made various attempts to produce CPD isoolefin copolymers with varying degrees of success; see, for example, U.S. Pat. Nos. 3,239,495; 3,242,147; British Patent 1,036,618 and *I & EC Prod R and D*, 1, 216-20 (1962) incorporated herein by reference. These polymers, however, have substantially no commercial significance because, even when only minor amounts of CPD were present, they are very low in number average molecular weight.

U.S. Pat. No. 2,521,359, herein incorporated by reference, teaches a method for preparing a plastic-like copolymer of cyclopentadiene and isobutylene, wherein the formed copolymers of low molecular weights have at least 50% of the cyclopentadiene incorporated therein. Furthermore, the process for forming these copolymers is not adaptable for the formation of the polymers of the instant invention. These copolymers are used for air cured coatings and are incapable of forming high performance synthetic rubbers.

Accordingly, the present invention teaches a method for forming unique and novel copolymers of isobutylene-cyclodiolefin and terpolymers of isobutylene-cyclodiolefin and acyclic diolefin as well as multipolymers where more than one cyclodiolefin is present. Preferred cyclodiolefins are cyclopentadiene and methylcyclopentadiene or mixtures thereof. Preferred acyclic diolefins include isoprene and piperylene, preferably isoprene. The unsaturation can be about 5 to about 45 mole %, preferably about 8 to about 40 mole % and $\overline{M}n$'s can be about 30,000 to about 90,000, preferably about 50-90,000, more preferably about 60,000-90,000, most preferably about 70-90,000, wherein the physical properties and oil extensibility of these polymers are quite unexpectedly acceptable for major tire applications and other major applications, heretofore limited to Butyl rubber or halobutyl rubber having a minimum $\overline{M}n$ of about 120,000. These new polymers of the present application clearly solve the problem of how to reduce the $\overline{M}n$ of an elastomer while maintaining its physical properties thereby effectively creating a production cost savings.

SUMMARY OF THE INVENTION

It has been found that substantially gel-free copolymers of isoolefins and cyclo conjugated diolefins having a mole % unsaturation of about 5 to about 45 mole % and a number average molecular weight ($\overline{M}n$) of about 30,000 to about 90,000, may be prepared by carrying out the polymerization in the presence of not more than about 40 wt. %, based on the total monomers plus cosolvent of a cosolvent which is a solvent for the polymer at the polymerization temperature and carrying out the reaction at a temperature of about $-80$ to $-110$. The catalyst is selected from the group consisting of aluminum halide and hydrocarbyl aluminum dihalide as disclosed in U.S. Pat. No. 3,856,763 herein incorporated by reference wherein the aluminum halide must be introduced into the reaction zone dissolved in a polar solvent.

The quantity of cosolvent used is varied with the temperature in order to effectively control molecular weight. The optimum cosolvent level is determined by selecting the minimum solvent-monomer ratio at which the copolymer to be prepared remains in solution at the polymerization temperature.

The process of this invention makes it possible to prepare valuable isobutylene-cyclodiolefin copolymers, terpolymers of isobutylene and a mixture of cyclodiolefins, terpolymers of isobutylene-cyclodiolefin and an acyclic diolefin and multipolymers containing isobutylene-cyclodiolefin(s) and acyclic diolefin(s) having an $\overline{M}n$ of about 30,000 to about 90,000, preferably an $\overline{M}n$ of about 50,000 to about 90,000, more preferably an $\overline{M}n$ of about 60,000 to about 90,000, most preferably an $\overline{M}n$ of about 70,000 to 90,000 and a mole percent unsaturation of about 5 to about 45 mole %.

To possess good physical properties, it is imperative that the copolymers and terpolymers of the instant invention incorporate critical levels of cyclic diolefin. These critical levels are related to the $\overline{M}n$ of the polymer. For example, at $\overline{M}n$ of 30,000 the minimum cyclodiolefin content must be about 35 mole % (e.g. 37%), while at an $\overline{M}n$ of 50,000 the minimum is about 20 mole % (e.g. 23%), at $\overline{M}n$'s of 60,000 and 70,000 the critical minimum unsaturations are about 15% (e.g. 18 mole % and 10 mole %) cyclodiolefin respectively. Non-cyclic diolefins may also be present in these polymers but they have little effect on the relationship of cyclodiolefin critical levels with $\overline{M}n$. Preferred cyclodiolefins include cyclopentadiene and methylcyclopentadiene or combinations of the two. Preferred acyclic diolefins include isoprene and piperylene, preferably isoprene.

Accordingly, it is an object of the present invention to prepare unique and novel copolymers of isobutylene-cyclopentadiene and isobutylene-methylcyclopentadi-cyclopentadiene, as well as terpolymers of isobutylene-cyclopentadiene and methyl-cyclopentadiene having an $\overline{M}n$ of about 30,000 to about 90,000 and a mole % unsaturation of about 5 to about 45 mole %, wherein the copolymers are readily adaptable as a direct replacement for Butyl rubber in major rubber applications.

Additionally, it is an object of the present invention to prepare unique and novel terpolymers of isobutylene-isoprene-cyclopentadiene having an $\overline{Mn}$ (measured by membrane osmometry) of about 30,000 to about 90,000 and a mole % unsaturation of cyclopentadiene of at least 5 mole % and total unsaturation limited to 45 mole %, (as measured by Infra Red technique) wherein the terpolymers are readily adaptable as a direct replacement for Butyl rubber in major rubber applications.

A further object of the present invention is to provide blend compositions of the co- and terpolymers with oils and fillers for improvement in both physical and rheological properties.

A still further object of the present invention is to provide blend compositions of the co- and terpolymers of the present invention with natural rubber, SBR rubbers, EPDM terpolymers, polybutadiene, butyl rubbers and halo butyl rubbers and mixtures thereof wherein the physical properties as well as ozone resistance are markedly improved.

BRIEF DESCRIPTION OF DRAWINGS

FIG. I shows the relationship between critical homogeneous polymerization temperature and diene content.

FIG. II shows the effect of polymerization temperature on number average molecular weight.

Figure 1:
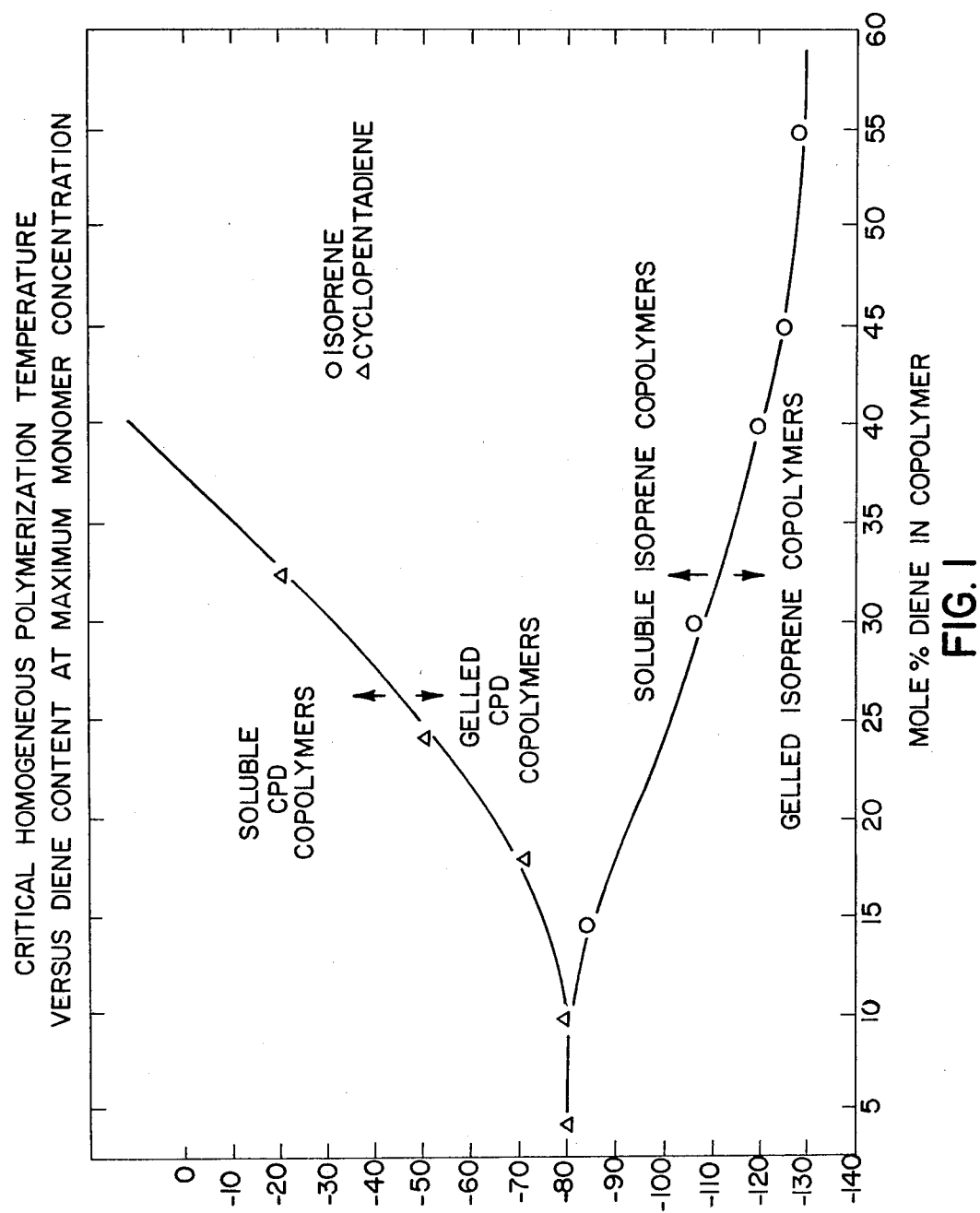

FIG. III shows the effect of cosolvent concentration on molecular weight.

FIG. IV shows the effect of polymerization temperature on total monomer conversion.

FIG. V shows catalyst efficiency as a function of cosolvent concentration.

FIG. VI shows the relationship between tensile strength and $\overline{Mn}$ for a base reference--Butyl rubber.

FIG. VII shows the relationship between tensile strength and $\overline{Mn}$ for an isobutylene-isoprene copolymer, wherein the mole % of isoprene is varied.

FIG. VIII shows the relationship between tensile strength and $\overline{Mn}$ for a copolymer of isobutylene-cyclopentadiene wherein the mole % of cyclopentadiene is varied.

FIG. IX shows the comparative relationship of mole % diolefin (diolefin equivalent in terminology to diene) to $\overline{Mn}^* \times 10^{-3}$ for copolymers of isobutylene-isoprene and isobutylene-cyclopentadiene, required to maintain maximum tensile strength at the reference level.

FIG. X shows the relationship between mole % of cyclopentadiene of copolymer of isobutylene-cyclopentadiene and Log $\overline{Mn}^*$ (the number average molecular weight required to maintain maximum tensile strength at the reference level).

DETAILED DESCRIPTION

One of the major properties of elastomers is the level of strength which can be achieved in its networks. Strength of elastomers is now known to be related to many survival properties of rubber materials. These survival properties include, for example, rupture, tearing, fatigue, cracking, etc. Tensile strength is considered to be a simple but excellent measure of the overall survival characteristics of elastomers. Tensile strength could thus serve as a measure to establish a base reference of the survival properties of polyisobutylene. This now can be achieved through the medium of butyl rubbers. It can be demonstrated that tensile strength does not vary significantly with the compositional variations available in Butyl rubbers (~97.5 to ~99.0 mole % isobutylene), and the values for tensile strength obtained on such networks could be considered representative of crosslinked polyisobutylene.

The elastomers of this invention represent a range of compositional change of isobutylene starting at ~95 mole %. According to the principles of this invention, the isobutylene units can be replaced by cyclopentadiene residues until the isobutylene content has been reduced to about 55 mole %. If the Butyl rubbers serve as an appropriate reference for the strength of polyisobutylene then use of this reference can be continued in use to follow the effects of very great compositional changes both as to amount and type represented by isobutylene isoprene and isobutylene-cyclopentadiene copolymers. (See FIG. VI).

It was found that modifications of compositions of Butyl rubber by increasing the isoprene content at lower number average molecular weights produced little effect on the maximum achievable tensile strength relative to the references. (See FIG. VII) Thus, a combination of results from copolymers with isoprene contents in the range of the Butyl rubbers of commerce (1.19 to 2.68 mole %), with those selected from the higher mole % unsaturation range of the present invention continued to show minimal effect on the maximum achievable tensile strength. Unexpectedly, the presence of cyclodiolefin such as cyclopentadiene in the copolymers produced marked compositional effects on the maximum achievable tensile strength. (See FIG. VIII and FIG. IX) The compositional effect of cyclopentadiene in the copolymers was found to be represented by the equation; $\overline{Mn}^* = ae^{bx}$, where $\overline{Mn}^*$ is the minimum number average molecular weight associated with reference strength values and a=number average molecular weight of the reference ("crosslinked" polyisobutylene) and equal to 120,000 and x=mole % concentration of cyclopentadiene as determined in a standardized test formulation. The value for b was found to be equal to −0.0377. As the equation indicates, the required number average molecular weight to provide strength values equivalent to the references decreases with increase of cyclopentadiene content in the copolymer. For example, at 8 and 40 mole % cyclopentadiene, the required number average molecular weights were about 89,000 and 27,000, respectively. The terpolymer networks of isobutylene isoprene cyclopentadiene show that the strength dependence on $\overline{Mn}$ is primarily related to the cyclopentadiene content.

This invention relates to a method of preparing substantially gel-free copolymers of an isoolefin and a cyclo conjugated multiolefin or mixture thereof wherein said copolymers have a number average molecular weight about 30,000 to about 90,000, more preferably about 50,000 to about 90,000 still more preferably about 60,000 to about 90,000, most preferably about 70,000 to about 90,000, and a mole % unsaturation of at least about 5 to about 45 mole %, more preferably at least about 8 to about 40 mole %, and most preferably the unsaturation is at least about 20 mole % for polymers of $\overline{Mn}$ between 30,000 and 50,000, at least about 15 mole % for $\overline{Mn}$ between 50,000 and 60,000, at least about 10 mole % for $\overline{Mn}$ between 60,000 and 70,000 and at least about 5 mole % for $\overline{Mn}$ between 70,000 and 90,000.

Additionally, terpolymers of isobutylene isoprene and cyclopentadiene can be prepared according to the method embodied by the method of the present instant invention, wherein these terpolymers having a number average molecular weight ($\overline{Mn}$) of about 30,000 to about 90,000, more preferably about 50,000 to about 90,000 and still more preferably about 60,000, most preferably about 70,000 to about 90,000; and a mole % unsaturation of cyclopentadiene at least 5 to about 45 mole % more preferably at least 8 to about 40 mole %, and most preferably the unsaturation is at least 20 mole % cyclopentadiene for polymers with $\overline{M}n$ between 30,000 and 50,000 at least about 15 mole % for $\overline{M}n$ between about 50,000 and 60,000, at least about 10 mole % for $\overline{M}n$ between 60,000 and 70,000, and at least about 5 mole % for $\overline{M}n$ between 70,000 and 90,000. The total unsaturation from isoprene and cyclopentadiene is preferably between 8 and 45 mole %, more preferably between 8 and 40 mole %, most preferably between 12 and 30 mole %.

In order to obtain the desired number average molecular weights of the co- and terpolymer, the reaction must be carried out below about $-80°$ C., more preferably about $-90°$ C. to $-110°$ C. To obtain the desired number average molecular weight in a substantially gel-free polymer, a homogeneous polymerization is required and this is achieved by carrying out the reaction in a vehicle which is a solvent for the copolymer at the reaction temperature. The vehicle comprises predominantly the monomers to be polymerized in conjunction with an inert cosolvent or mixtures of inert cosolvents. The vehicle (monomers plus cosolvent) must of course be liquid at the polymerization temperature.

It is essential in carrying out the process of this invention that the cosolvent comprise at least 5% by volume and not more than 40% by volume of the total cosolvent-monomers system. Preferably, about 5 to about 30 volume % cosolvent is used, more preferably about 5 to 20 volume %, most preferably about 5 to about 15 volume %, e.g., 10 volume %.

The optimum amount of cosolvent to be used is the minimum amount necessary to avoid gelation. If too little cosolvent is used gelation of the product results. Too high a level results in undesirable lowering of number average molecular weight below the minimum desired $\overline{M}n$ as indicated in Figure X.

For the purpose of this invention, it is convenient to define the volume % of inert cosolvent as that calculated based on the volume of monomers at about $-78°$ C. (dry ice temperature) while the volume of cosolvent is determined at 25° C. The volume % of cosolvent as calculated is uncorrected for volume changes and cooling of the cosolvent to reaction conditions.

The minimum quantity of a given cosolvent required to produce gel-free polymers is a function of the cosolvent, the conjugated cyclomultiolefin used and the polymerization temperature. Having selected the composition of the blend of monomers and the cosolvent to be used the minimum quantity of cosolvent required is readily determined by carrying out the polymerization using varying amounts of cosolvent. The minimum quantity of cosolvent necessary is that amount required to maintain a homogeneous system; that is to prevent precipitation of polymer during polymerization.

The term "cosolvent" as used in the specification and claims means the inert solvent which, together with the monomer feed, comprises the vehicle for the reaction. The cosolvent and monomers must be mutually soluble and the blend of monomers plus cosolvent must be a solvent for the copolymer at the polymerization temperature. The term "inert" means that the cosolvent will not react with the catalyst or otherwise enter into the polymerization reaction. The cosolvent must not contain substitutents in its molecule which will interfere with the polymerization reaction. Aliphatic and cycloaliphatic hydrocarbons are suitable cosolvents. The preferred cosolvents are paraffinic hydrocarbons, cycloaliphatic hydrocarbons and carbon disulfide and mixtures thereof. Preferably, the paraffinic hydrocarbon or cycloaliphatic hydrocarbon solvent is a $C_5-C_{10}$ hydrocarbon, more preferably a $C_5-C_8$ hydrocarbon. Illustrative examples of the hydrocarbon solvents are pentane, isopentane, methylpentane, hexane, cyclohexane, methylcyclohexane, dimethylcyclohexane, heptane, isooctane, 1,2,3,3-tetramethyl hexane, tetramethyl cyclohexane, etc. Generally any paraffin, whether normal, branched or cyclic which is a liquid under polymerization conditions, may be used. The term "paraffin" as used in the specification and claims includes normal paraffins, cycloparaffins and branched paraffins. The preferred cosolvents are cycloparaffins or paraffinic mixtures containing cycloparaffins, preferably $C_6-C_7$ cycloparaffins (i.e. cyclohexane, methylcyclohexane), utilized at about 5 to about 30 volume %, e.g., 10 to about 20 volume %.

It will be evident to those skilled in the art that since the monomers act as part of the solvent system for the polymer, the conversion level of the polymerization must not be so great as to result in precipitation of the copolymer as a result of depletion of solvent. Preferably, the conversion level is about 2 to about 30, more preferably about 3 to 15%, most preferably about 5 to about 13%, e.g., 10%.

In the practice of this invention, the catalyst is an aluminum halide or a hydrocarbyl aluminum dihalide. Where an aluminum halide is used, it must be in the form of a homogeneous solution or submicron dispersion of catalyst particles, e.g., colloidal dispersion. Therefore, the catalyst must be dispersed or dissolved in a suitable catalyst solvent or mixture of solvents. The catalyst solvent must be a polar solvent. Illustrative examples of suitable aluminum halides are $AlCl_3$ and $AlBr_3$. The preferred aluminum halide catalyst is aluminum chloride.

It is essential in carrying out this invention that the aluminum halide catalyst be in solution in the polar organic solvent prior to introduction of the catalyst to reaction medium. Combining the polar organic solvent with the reaction medium and thereafter adding the aluminum halide catalyst thereto will not result in the production of the desired $\overline{M}n$, high unsaturation polymers of this invention.

Use of the term "solution" with reference to the polar organic solvent/aluminum halide systems is intended to include both true solutions and colloidal dispersions since they may exist concurrently in the same system.

The aluminum halide/polar solvent catalyst preferably comprises about 0.01 to about 2 wt. % aluminum halide, more preferably about 0.05 to about 1, most preferably 0.1 to about 0.8.

As previously noted, the catalyst may also be a hydrocarbylaluminum dihalide. Where the hydrocarbylaluminum halide is the catalyst, wherein the hydrocarbyl group can be a $C_1-C_{18}$ straight chain, branched or cyclic group. Both cycloaliphatic and aromatic substituents can comprise the hydrocarbyl radical. Alkyl groups, especially lower alkyl groups, e.g. $C_1-C_4$, are preferred because of their general availability and economy of use. The halide can be bromine or chlorine, preferably chlorine. The term "dihalide" as used in the specification and claims means dichloride or dibromide.

Illustrative examples of these hydrocarbylaluminum dihalides are methylaluminum dichloride, ethylaluminum dichloride, isobutylaluminum dichloride, methylaluminum dibromide, ethylaluminum dibromide, benzylaluminum dichloride, phenylaluminum dichloride, xylylaluminum dichloride, toluylaluminum dichloride, butylaluminum dichloride, hexylaluminum dichloride, octylaluminum dichloride, cyclohexylaluminum dichloride, etc. The preferred catalysts are methylaluminum dichloride, ethylaluminum dichloride and isobutylaluminum dichloride.

The hydrocarbylaluminum dihalide catalyst may be added neat or in solution. Preferably where a catalyst solvent is used, it is a liquid paraffin solvent or cycloparaffin solvent. It is advantageous though not necessary to use paraffins of low freezing point. Methylcyclohexane is particularly useful since catalyst solutions of about 1% concentration do not freeze at $-120°$ C.

The concentration of the catalyst is not critical. Very dilute catalyst solutions, however, are not desirable since substantial fractions of the catalyst may be deactivated by impurities. Very concentrated solutions are undesirable since at polymerization temperatures catalyst may be lost by freezing out of solution.

In carrying out the polymerization of this invention, those skilled in the art will be aware that only catalytic amounts of catalyst solution are required. Preferably, the volume ratio of monomer plus cosolvent to catalyst solution is about 100/1 to about 9/1, more preferably about 80/1 to about 10/1, most preferably about 50/1 to about 20/1.

The term "polar solvent" as used in the specification and claims means non-aromatic, organic solvents having a dielectric constant at 25° C. of at least 4, preferably about 4 to about 20, more preferably about 6 to about 17, most preferably about 9 to about 13. These polar solvents, however, must not contain sulfur, oxygen, phosphorus or nitrogen in the molecule since compounds containing these elements will react with or otherwise deactivate the catalyst.

The preferred polar solvents are inert halogenated aliphatic hydrocarbons; more preferably halogenated paraffinic hydrocarbons and vinyl or vinylidene halides, most preferably primary or secondary chlorinated paraffinic hydrocarbons. The halogenated hydrocarbon is preferably a $C_1$–$C_5$ paraffin hydrocarbon; more preferably a $C_1$–$C_2$ paraffin. The ratio of carbon atoms to halogen atoms in the polar solvent is preferably 5 or less. Preferably the halogen is chlorine.

Illustrative examples of these polar organic solvents are methylchloride, ethyl chloride, propyl chloride, methyl bromide, ethyl bromide, chloroform, methylene chloride, vinyl chloride, vinylidene chloride, dichloroethylene, etc. Preferably, the polar solvent is methyl chloride or ethyl chloride. Generally, any inert halogenated organic compound which is normally liquid under polymerization conditions and has a dielectric constant of at least 4.0 may be used.

In practicing the process of this invention, it is essential that the polymerization be carried out in the homogeneous phase without the precipitation of polymer. Conventional slurry processes are inapplicable for the preparation of the high unsaturation polymers of this invention since by their nature they result in polymer precipitation with gelation of the polymer as a consequence.

The amount of cosolvent required in order to maintain the polymerization reactants and product in solution throughout the polymerization is a function of the cyclopentadiene and its concentration in the monomer feed. The polymerization temperature at which precipitation of polymer will occur is itself a function of the amount of and type of cosolvent and the cyclopentadiene.

The term "critical homogeneous polymerization temperature" as depicted in FIG. I as used in the specification and claims means that polymerization temperature below which precipitation of polymer will occur, when no cosolvent is included in the reaction mixture, i.e., the only solvent for the reactants and product being the monomer feed.

Characterization of polymers prepared by bulk polymerization, i.e., without cosolvent, shows that the polymers formed are low in number average molecular weight ($\overline{M}n$). In order to increase $\overline{M}n$, the lowering of polymerization temperature is an obvious expedient. However, in the absence of cosolvent, the result is gelation.

The problem of gelation is obviated by the addition of a cosolvent which permits the lowering of polymerization temperature below the critical homogeneous polymerization temperature. It has been found that a polymerization temperature below about $-80$ is necessary in order to achieve $\overline{M}n$ values of at least 30,000 for cyclopentadiene copolymer and terpolymers. At least 5 volume % inert solvent based on the monomer feed is necessary in order to carry out the polymerization in solution at these low temperatures.

Figure 2:
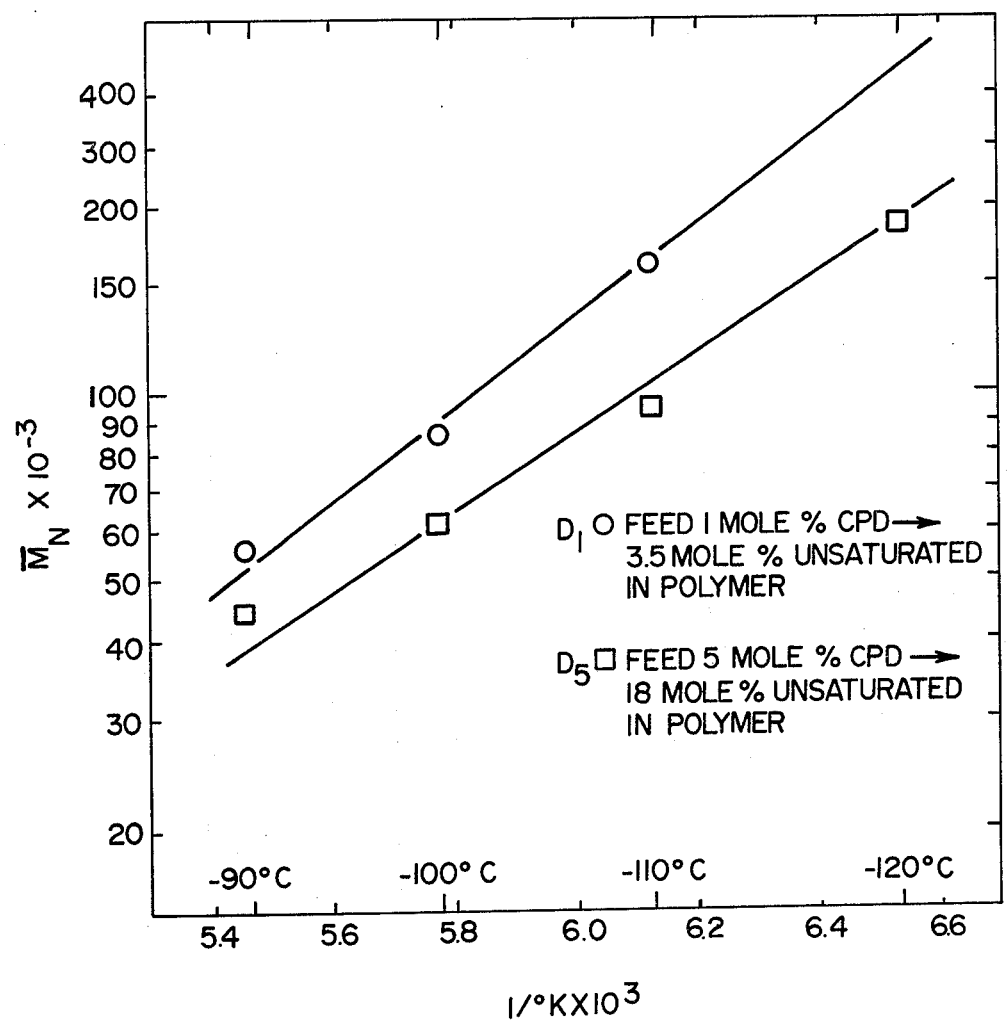
Figure 3:
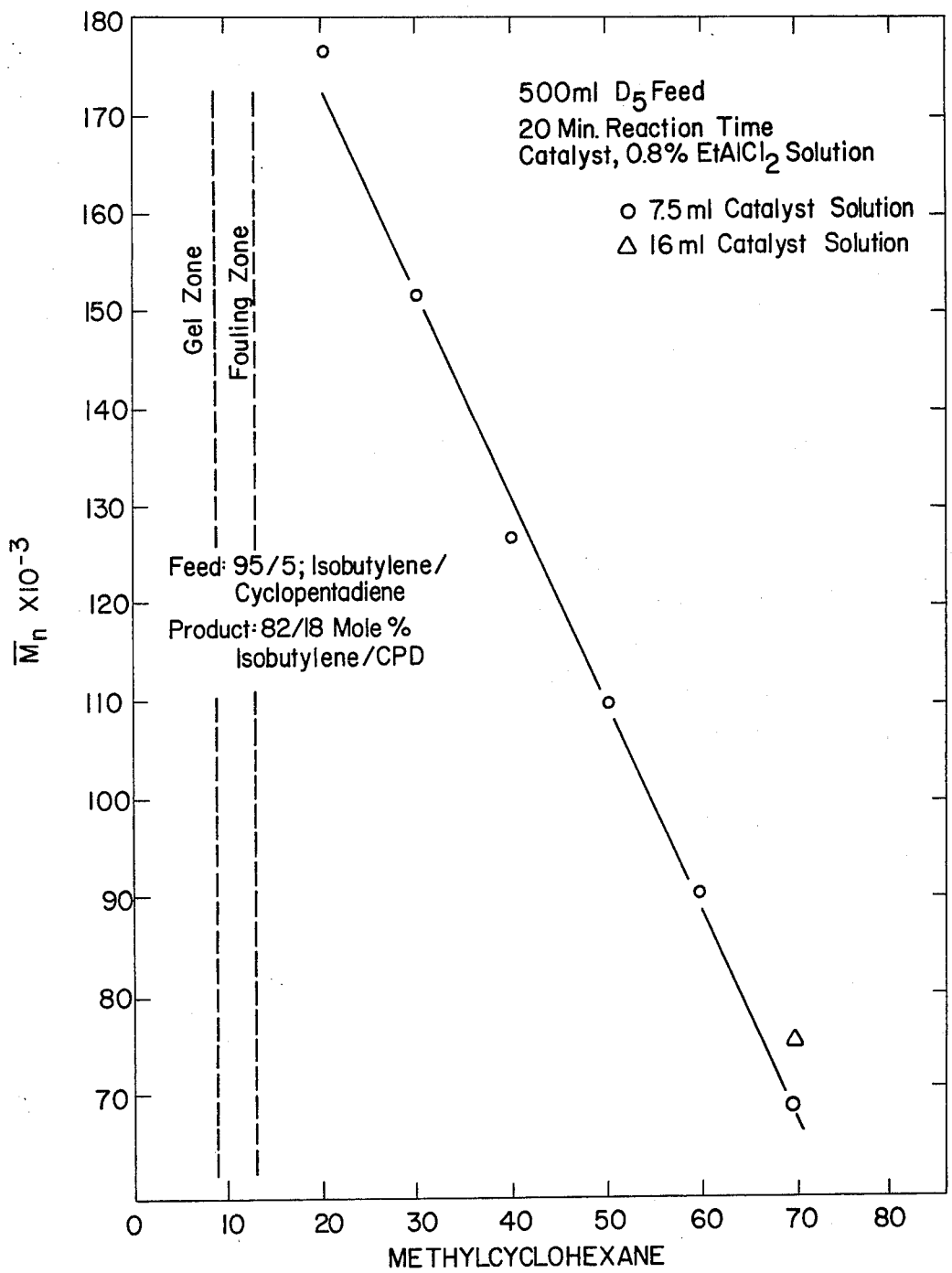
Figure 4:
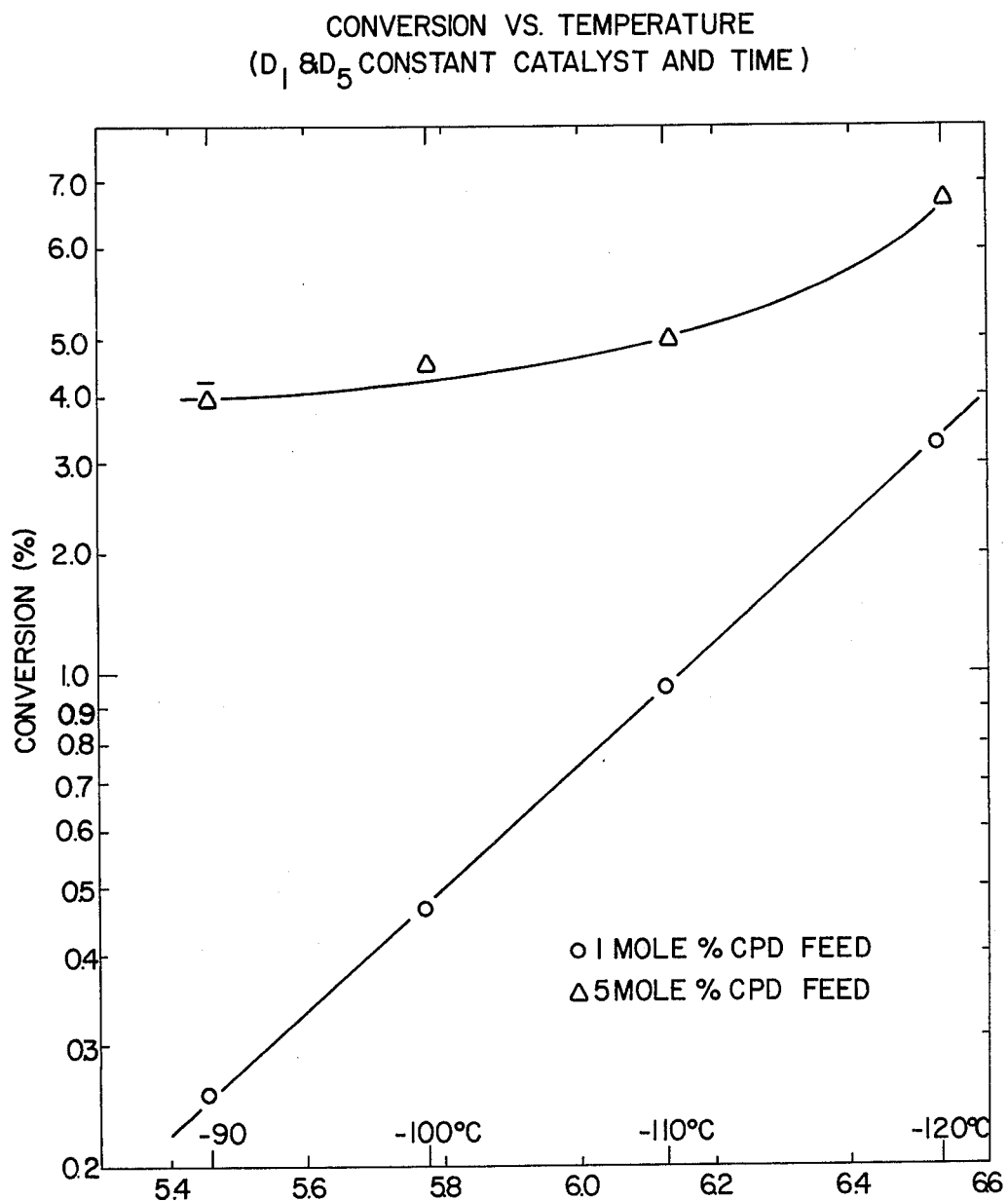
Figure 5:
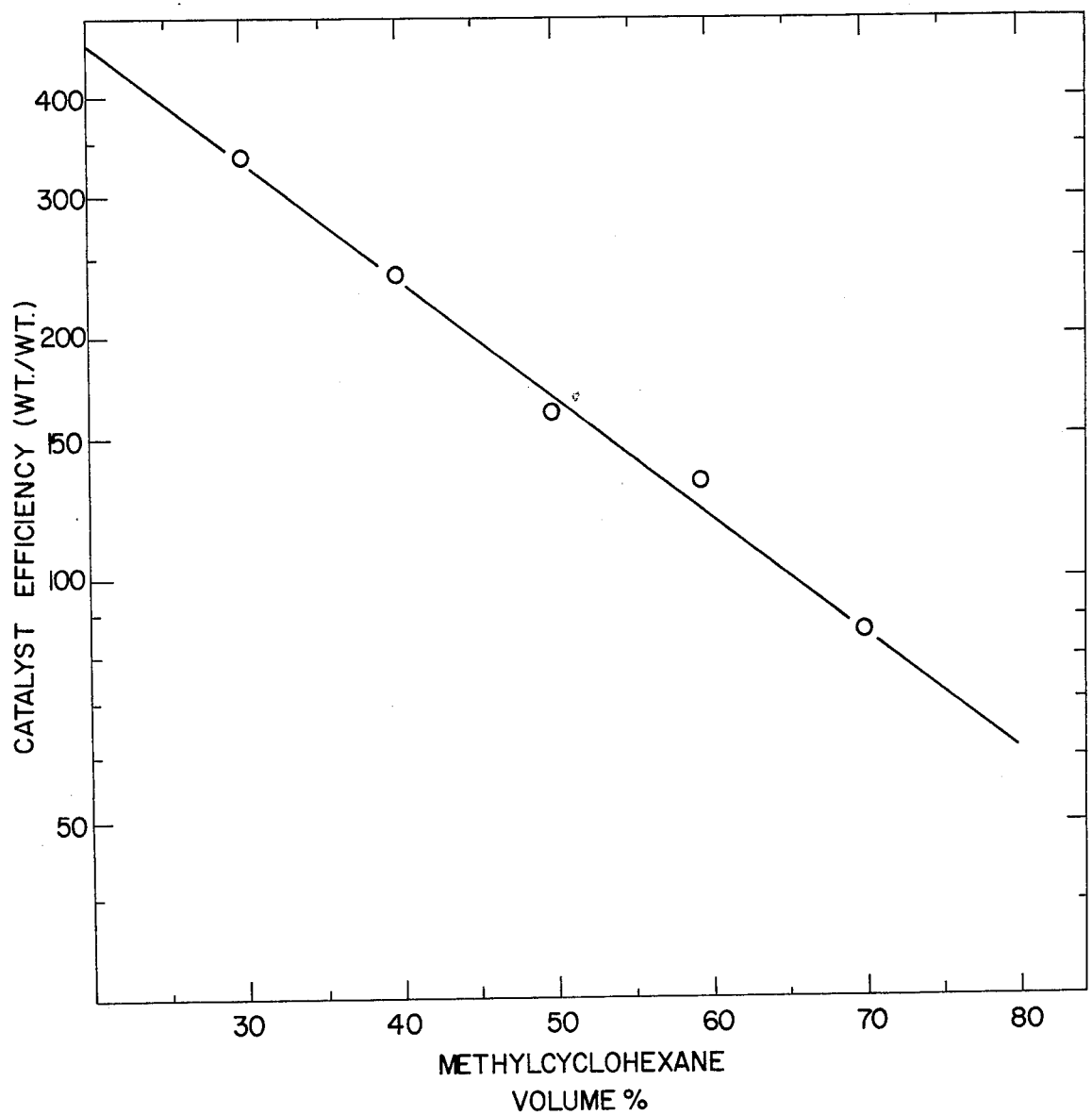
Figure 6:
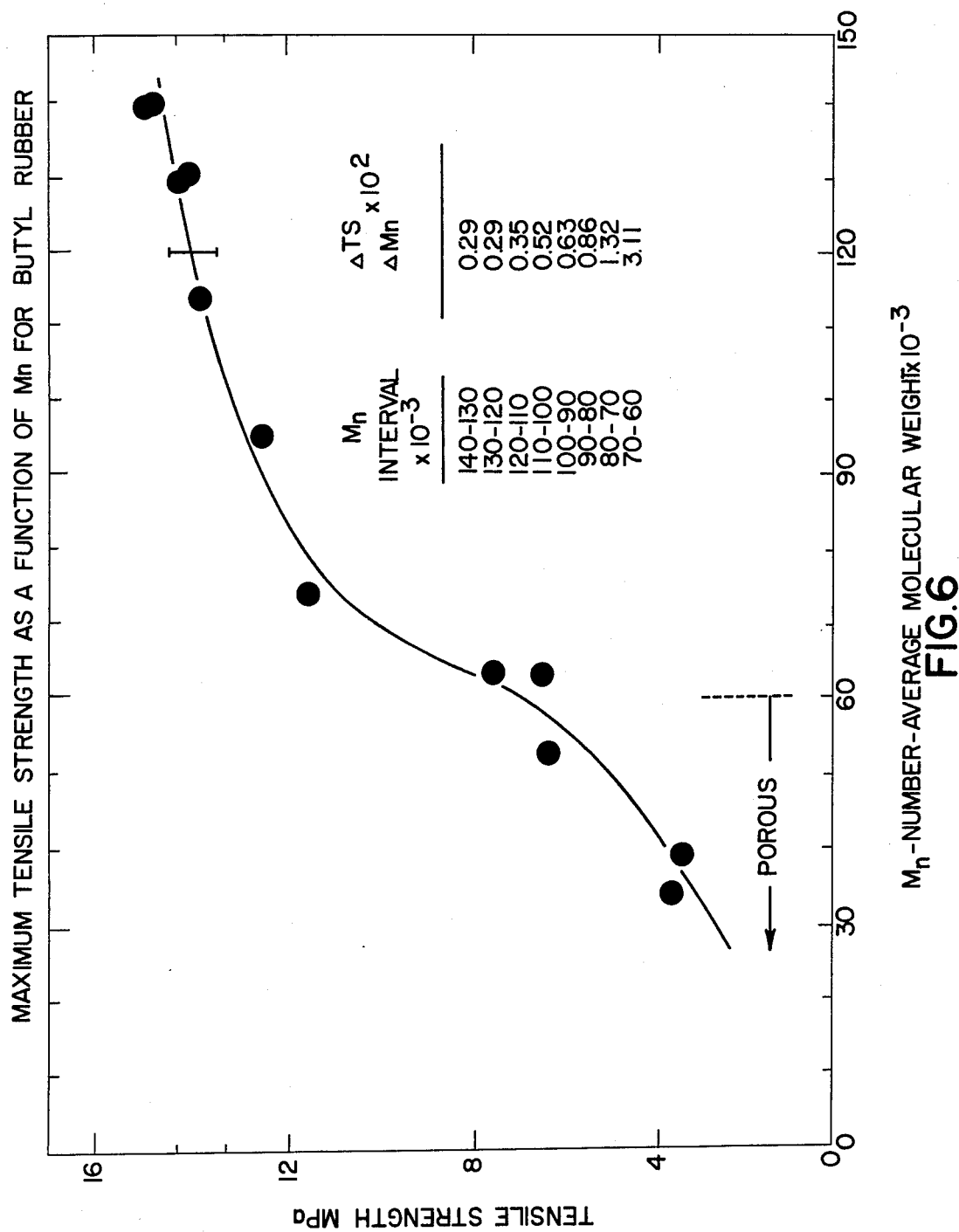
Figure 7:
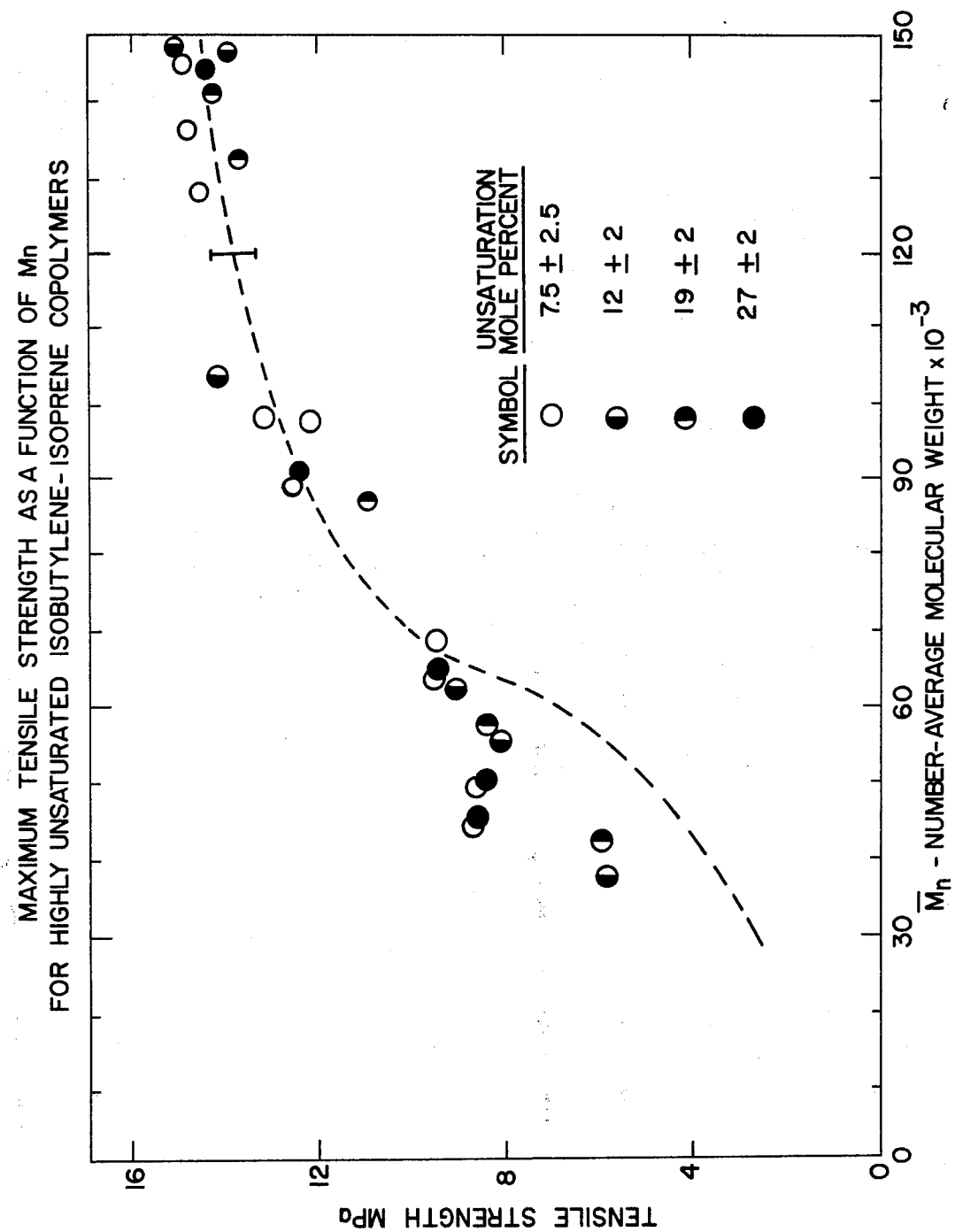
Figure 8:
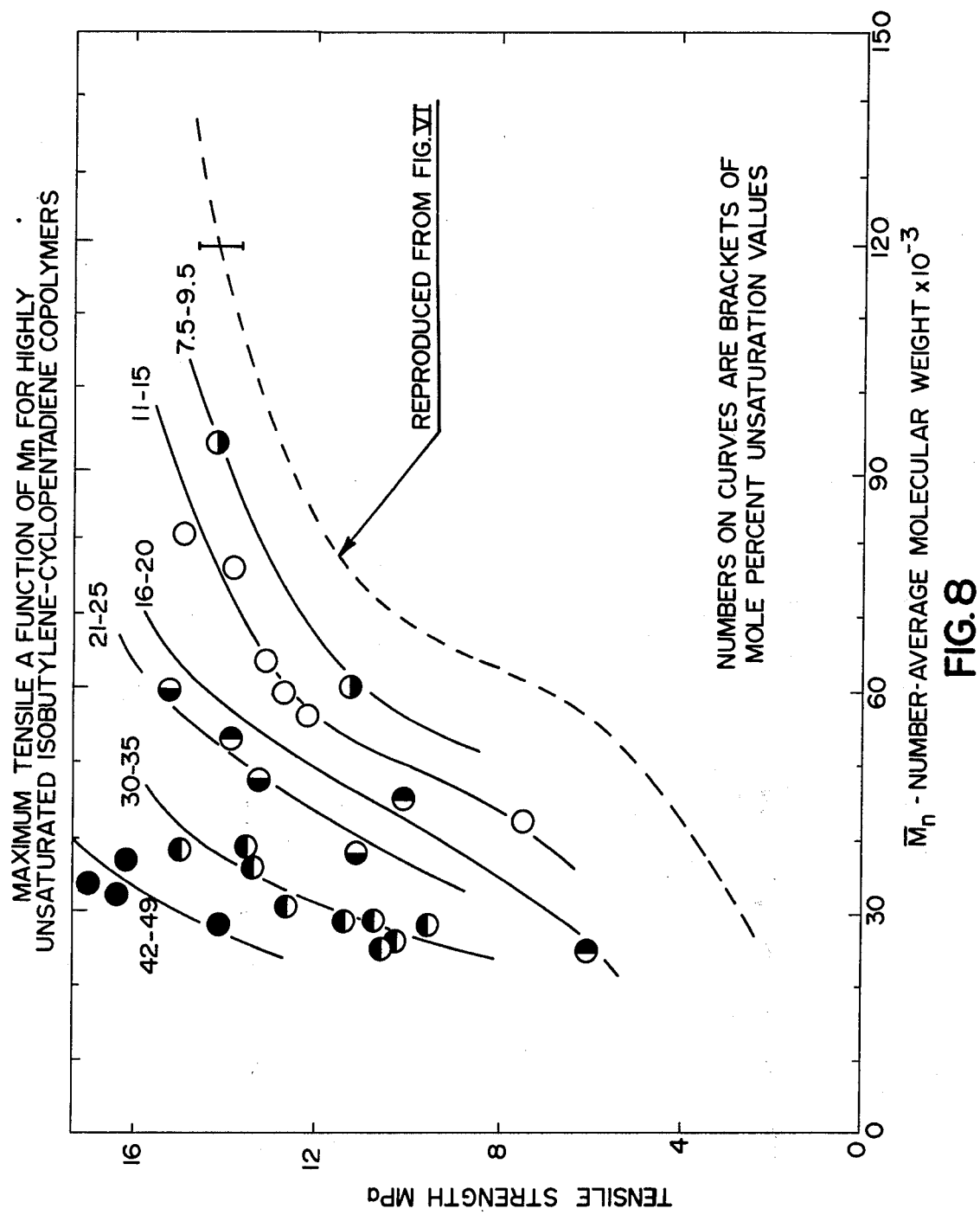

The necessity for utilizing low polymerization temperatures is exemplified by FIG. 2 which shows the exponential decrease in number average molecular weight with increasing temperature. The criticality of selecting the proper quantity of cosolvent is demonstrated in FIG. 3. Too little cosolvent results in precipitation of the polymer with reactor fouling or gelation. Further benefits of low temperature and proper selective of appropriately low cosolvent concentration are demonstrated in FIGS. 4 and 5. FIG. 4 shows that reactivity is favored by low temperatures (in addition to the molecular weight benefit). FIG. 5 shows that catalyst efficiency is favored by low cosolvent concentration (in addition to the molecular weight benefit).

In practicing the process of this invention, one skilled in the art may proceed as follows in order to determine the preferred reaction conditions.

First, a convenient polymerization temperature below about $-80°$ C. is selected. Next the desired feed composition, i.e. monomers and ratio of isobutylene to cyclopentadiene and the cosolvent to be used are selected. Polymerization reactions are carried out using successively greater amounts of solvent. The initial polymerization reaction is carried out using 5 volume % based on the total of monomer plus solvent of the cosolvent since lesser amounts will be inadequate. In each successive run an additional 5 volume % is added. The procedure is continued until the reaction medium remains clear throughout the reaction. Turbidity is indicative of precipitation of polymer which leads to reactor fouling or gelation.

The polymer formed is characterized for $\overline{M}n$ and mole % unsaturation. Where a higher $\overline{M}n$ is desired, it may be achieved by either lowering the polymerization temperature or where possible using slightly less solvent than determined by the above method, e.g., 1–2 volume % less, provided that turbidity does not occur. Reduction of polymerization temperature may result in a greater cosolvent requirement. Hence, the aforegoing procedure of adding additional solvent to the reaction medium must be continued until the reaction medium is again clear throughout the polymerization.

Where the mole % unsaturation is to be adjusted, somewhat more or less of the cyclopentadiene is used depending on whether a slightly higher or lower unsaturation is desired. Change in feed composition and/or conversion may require readjusting the cosolvent requirement. Generally, increasing the cyclopentadiene content of the monomer feed increases the cosolvent requirement.

The optimum reaction conditions are those which give the desired $\overline{M}n$ at the highest (warmest) temperature for the desired unsaturation level. Economic considerations dictate the use of the warmest temperature practical for polymerization. Use of lower temperatures will necessitate the use of greater amounts of cosolvent.

In an alternate approach to determine the necessary quantity of cosolvent, the reactions are carried out in bulk without using cosolvent. For each different cyclopentadiene content monomer feed, polymerizations are carried out at progressively lower temperatures until the critical homogeneous polymerization temperature for the feed composition is determined. The polymerization is repeated for different feed compositions and the data obtained are the critical homogeneous polymerization temperatures as a function of cyclopentadiene content of the feed. A plot of these data give the critical homogeneous polymerization temperature curve analogous to that of FIG. I. The polymer formed is analyzed for cyclopentadiene content and a determination is made of the correlation mole % unsaturation in the polymer and volume % cyclopentadiene in the feed. The polymer formed in bulk copolymerization of isobutylene and cyclopentadiene is unsuitable for commercial use since it has a very low $\overline{M}n$. In order to control the $\overline{M}n$ of the polymer between about 30,000 to about 90,000, it is necessary to carry out the polymerization at lower temperatures, e.g., less than about −80° C., which requires the addition of cosolvent to prevent precipitation of polymer during polymerization.

The quantity of solvent used should be kept to a minimum since excess cosolvent results in the lowering of $\overline{M}n$. In determining the amount of solvent to be used the monomer feed composition is determined. A convenient polymerization temperature below about −80° C. is selected.

The minimum cosolvent requirements for isobutylene cyclopentadiene may be determined by carrying out the polymerization at the critical homogeneous polymerization temperature for the isobutylene cyclopentadiene feed composition, terminating the polymerization by destroying the catalyst and, with constant stirring, lowering the temperature of the system to the desired polymerization temperature. The polymer which, of course, is by definition insoluble below the critical homogeneous polymerization temperature will precipitate out and the system will appear turbid. The polymer will not be gelled, however, since polymerization was terminated prior to precipitation. The cosolvent selected is then added in incremental amounts until the turbidity disappears. The quantity of solvent so added is a good approximation of the minimum solvent requirements for a given isoolefinmultiolefin feed to be polymerized at a given temperature.

The term "solution polymerization" as used in the specification and claims means a polymerization carried out so that the polymer product remains dissolved throughout the reaction.

Utilizing the process of this invention, it is now possible to prepare such cyclodiene copolymers having as little as 5 mole % unsaturation and as high as 45 mole % unsaturation; more preferably at least about 8 to about 40 mole % and more preferably the unsaturation is at least about 20 mole % for polymers of $\overline{M}n$ between 30,000 and 50,000, at least about 15 mole % for $\overline{M}n$ between 50,000 and 60,000, at least about 10 mole % for $\overline{M}n$ of about 60,000 and 90,000 and at least about 5 mole % for $\overline{M}n$ between 70,000 and 90,000. As a result of the relatively lower reactivity of the olefinic residue, copolymers having incorporated therein about 2-4 mole % cyclic diene are about as reactive as butyl rubber having an isoprene content of about 0.5 to about 1.5 mole % and therefore require ultra acceleration for practical sulfur vulcanization. The higher unsaturation copolymers and terpolymers, e.g., at least 5 mole %, preferably at least 8 mole %, of cyclopentadiene may be sulfur vulcanized using the delayed action accelerator cure systems.

In general, the copolymers of this invention must not contain more than 45 mole % unsaturation. When the multiolefin is a cyclic multiolefin above 45 mole % unsaturation, the glass transition temperature of the polymer is too high. As a result, the polymers have poor low temperature characteristics. The terpolymers of this invention have about 5 to about 45 mole % cyclopentadiene unsaturation, more preferably at least about 8 to about 40 mole %, and most preferably the unsaturation is at least about 20 mole % cyclopentadiene for polymers with $\overline{M}n$ between 30,000 and 50,000, at least about 15 mole % for $\overline{M}n$ between 50,000 and 60,000, at least about 10 mole % for $\overline{M}n$ between 60,000 and 70,000, and at least about 5 mole % for $\overline{M}n$ between 70,000 and 90,000. The total unsaturation for isoprene and cyclopentadiene is preferably between 8 mole % and 45 mole %, more preferably between 8 and 40 mole %, and most preferably between 12 and 30 mole %.

The products of this invention offer a number of important advantages over the commercially available Butyl rubbers. In addition to possessing superior cold flow and green strength properties while retaining the low air permeability and mechanical damping characteristics of conventional low unsaturation isoolefin copolymers, the products of this invention offer greater versatility in vulcanization techniques. Furthermore, while the vulcanization of conventional isoolefin-multiolefin copolymers requires the use of ultra-accelerator type cures, e.g., thiuram (Tuads) or dithiocarbamates (Tellurac), the products of this invention may be vulcanized using the thiazole, e.g., mercaptobenzothiazole, type cures currently used in the vulcanization of general purpose rubbers, e.g., natural rubber, SBR, polybutadiene, etc. Because of certain factors of which premature vulcanization (scorch) is a prime example, modern practice has tended towards the use of a special class of thiazoles called delayed action accelerators. These delayed action accelerators permit the processing of the compounded rubber (including vulcanizing agents) at elevated temperature for a predetermined period of time before vulcanization commences. Such cure techniques are not possible with conventional isoolefin copolymers. The delayed action accelerators are, however, used advantageously in the vulcanization of the isoolefin copolymers of this invention.

The delayed action accelerators suitable for use in vulcanizing the products of this invention include the benzathiole sulfenamides having the general formula:

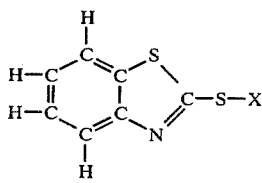

wherein X is an amino group. The amino group is mono- or diorganosubstituted and may be cyclic including heterocyclic. For example, X may be

or —N—$R_2$ where $R_1$ is H or R and R is organo or cycloorgano. $R_2$ is a divalent organo radical. Illustrative examples of X are cyclohexylamino, tertiary butyl amino, diisopropyl amino, dicyclohexyl amino, pentamethylene-amino, morpholino, 2-(2,6-dimethyl morpholino), etc. Specific illustrative examples of these sulfenamides are N,N-diethylbenzothiazole-2-sulfenamide, N-N-diisopropyl benzothiazole-2-sulfenamide, N-tertiary butyl benzothiazole-2-sulfenamide, N-cyclohexyl benzothiazole-2-sulfenamide, N,N-dicyclohexyl benzothiazole-2-sulfenamide, 2-(morpholino) benzothiazole sulfenamide, 2-(2,6-dimethyl morpholino) benzothiazole sulfenamide, 2-piperdinyl benzothiazole sulfenamide. In general, any benzathiazole sulfenamide may be used as a delayed action accelerator for the sulfur vulcanization of the polymer of this invention.

The delayed action accelerator is incorporated into the vulcanizable polymer composition at preferably about 0.1 to about 5 wt. % based on the polymer; more preferably about 0.25 to about 3.5; most preferably about 0.5 to about 3.0 wt. %, e.g. 0.5 to about 2.5 wt. %.

It is, of course, obvious to those skilled in the art that the delayed action cures are sulfur cures and sulfur must be incorporated into the polymer blend either as elemental sulfur or as nonelemental sulfur. Suitable nonelemental sulfur is in the form of those compounds which will release sulfur to the polymer under vulcanization conditions. For a description of these nonelemental sulfur compounds, generally, see *Vulcanization of Elastomers*, Ch. 4, J. C. Ambelang, Reihold, New York 1964 incorporated herein by reference. Illustrative examples of these nonelemental sulfur compounds are dimorpholvinyl disulfide and alkyl phenol disulfides. The term "sulfur donor" as used hereinafter in the specification and claims means elemental sulfur as well as the aforementioned nonelemental sulfur compounds. The quantity of sulfur donor required for vulcanization is well known to those skilled in the art. Where the sulfur donor is elemental sulfur, it is incorporated into the polymer at about 0.1 to about 5 wt. % based on the polymer; more preferably about 0.25 to about 3.5 wt. %; most preferably about 0.5 to about 3.0 wt. %, e.g., 0.5 to about 2.5 wt. %. Where the sulfur donor is a nonelemental sulfur compound, it is incorporated at a wt. % of about three times that required for elemental sulfur. The term "nonelemental sulfur compounds" means organic compounds containing sulfur and capable of donating the sulfur to a vulcanization reaction, e.g., disulfides and polysulfides.

The delayed action accelerators may be modified by retarders and activators which will respectively retard or activate the sulfur vulcanization. The addition of the retarder will further delay the time at which vulcanization occurs while the activator will cause vulcanization to occur sooner, e.g., shorter delay time.

The retarders suitable for use in the practice of this invention include organic compounds having a $pK_a$ of about 2 to less than 7; preferably about 3 to about 6.5; more preferably about 4 to about 6, e.g., 5. The term $pK_a$ is the dissociation constant as measured in aprotic solvents, see for example *Acid-Base Behavior in Aprotic Solvents* NBS Monograph 105, August 1968.

The activators suitable for use in the practice of this invention are metallic oxides, hydroxides and alkoxides of Groups IA and IIA metals of the Periodic Table of Elements and organic compounds having a $pK_a$ of about 8 to about 14; preferably about 9 to about 12; more preferably about 9.5 to about 11, e.g. 10.

Illustrative examples of retarders are N-nitroso diphenylamine, N-cyclohexyl thiophthalamide, phthalic anhydride, salicyclic acid, benzoic acid, etc. Generally, the preferred retarders are nitroso compounds, phthalimides, anhydrides and acids.

Illustrative examples of activators are MgO, diphenylguanidine, hexane-1-amine, 1,6-hexane diamine, sodium methoxide, etc. The preferred activators are guanidines and amines.

The retarders and activators are preferably incorporated into the polymer at about 0.1 to about 5 wt. %; more preferably about 0.25 to about 3.5 wt. %; most preferably about 0.5 to about 3.0 wt. %, e.g., 0.5 to about 2.5 wt. %.

These copolymers of isoolefins and cyclodienes, e.g., isobutylene and cyclopentadiene possess markedly improved resistance to degradation by ozone over the acyclic diene copolymers. Although it has been postulated that such copolymers would have such improved properties as a result of having the unsaturation located in a side chain rather than in the backbone, it has heretofore not been possible to prepare substantially gel-free isoolefin-cyclodiene copolymers having number average molecular weight below about 90,000 which are commercially acceptable as direct replacements for Butyl rubber.

The highly unsaturated polymers of this invention are substantially as impermeable to air as are commercial low unsaturates, e.g., 1.5 mole % Butyl rubbers. Surprisingly, isoolefin copolymers of CPD or terpolymers of an isoolefin CPD and isoprene are less permeable to air at the higher unsaturation levels than is the low unsaturation Butyl rubber of commerce.

Thus, the process of this invention permits the preparation of isobutylene cyclopentadiene or methylcyclopentadiene copolymers and terpolymers of isobutylene cyclopentadiene and methylcyclopentadiene and terpolymers of isobutylene isoprene cyclopentadiene heretofore unattainable, which surprisingly retain all the advantageous characteristics of conventional low unsaturation and high molecular weight Butyl rubber while exhibiting improved vulcanization characteristics and improved ozone resistance and air impermeability.

The term "substantially gel-free" as used in the specification and claims means copolymers containing less than 2 wt. % gel; more preferably less than 1% gel, e.g., 1/2% gel. The term "D#", wherein # is an integer means the volume % cyclopentadiene in a monomer mixture, wherein D represents cyclopentadiene and the integer is the volume % diene.

The copolymers and terpolymers of the instant invention can be readily blended with other rubbers for modification of physical and chemical properties by techniques well known in the art. These other rubbers are selected from the group consisting of non-polar crystallizable rubbers (i.e. crystallization either included by low temperature or strain or a mixture thereof), polar crystallizable rubbers, non-polar, non-crystallizable rubbers, and polar non-crystallizable rubbers. These rubbers are contained in the blend compositions at a concentration level of about 5 to about 900 parts by weight per 100 parts of the polymer, more preferably about 25 to about 500 and most preferably about 50 to about 300. Typical, but non-limiting examples of each class are: non-polar crystallizable rubbers, natural rubber, low isoprene butyl rubbers; polar crystallizable rubbers-polychloroprene rubbers (i.e., the neoprene types), non-polar non-crystallizable rubbers-styrene butadiene copolymers, polybutadienes and more highly unsaturated butyl rubbers; and polar non-crystallizable rubbers-butadiene acrylonitrile copolymers.

The fillers employed in the present invention are selected from the group consisting of carbon blacks, silica, talcs, ground calcium carbonate, water precipitated calcium carbonate, or delaminated, calcined or hydrated clays and mixtures thereof. These fillers are incorporated into the blend composition at about 5 to about 350 parts by weight per hundred parts of polymer, more preferably at about 25 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75.

The oils employed in the present invention are nonpolar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics.

The oils are incorporated into the blend composition at a concentration level of about 5 to about 200 parts by weight per hundred parts of polymer; more preferably at about 25 to about 150, and most preferably at about 50 to about 150.

Other plasticizers suitable for use in the present invention are medium viscosity ester plasticizers for special high efficiency in increasing resilience particularly at low temperature. Some examples, which are not intended to be limiting in scope are dioctyl phthalate, dioctyl azelate, dioctyl sebacate or dibutyl phthalate. The ester plasticizer is incorporated into the blend composition at a concentration level of about 5 to about 100 parts by weight per hundred of polymer, more preferably about 5 to about 75, and most preferably about 5 to about 50.

Terpolymers of isoolefins and cyclodienes, e.g., isobutylene isoprene and cyclopentadiene possess markedly improved resistance to degradation by ozone over the acyclic diene copolymers. Although it has been postulated that such terpolymers at low unsaturation level would have such improved properties as a result of having the unsaturation located in a side chain rather than in the backbone, it has heretofore not been possible to prepare substantially gel-free isoolefincyclodiene terpolymers at high levels of unsaturation.

As has been pointed out earlier the highly unsaturated terpolymers of this invention are substantially as impermeable to air as are commercial low unsaturates, e.g., 1.5 mole % Butyl rubbers. Surprisingly, isoolefin copolymers of CPD or terpolymers of an isoolefin-CPD and an acyclic diene are less permeable to air at the higher unsaturation levels than is the low unsaturation Butyl rubber of commerce.

Thus, the process of this invention permits the preparation of isoolefin copolymers and terpolymers, heretofore unattainable, which surprisingly retain all the advantageous characteristics of conventional low unsaturation Butyl rubber while exhibiting improved vulcanization characteristics, improved ozone resistance and air impermeability.

The practice of this invention can involve batch or continuous polymerizations either isothermal or multitemperature. Continuous polymerization is preferred since it is more convenient for commercial operation and gives more uniform (homogeneous) products. Molecular weight distributions ($\overline{M}_w/\overline{M}_n$) are preferably between 2.0 and 20.

DETAILED DESCRIPTION

The advantages of the physical properties of the compositions of the present invention can be more readily appreciated by reference to the following examples and table.

EXAMPLE 1

The quantities of reactants utilized in the preparation of these copolymers and terpolymers were measured as volume at −78° C. Cosolvent (MCH) was measured at 25° C.

Monomer mixes comprising varying quantities of isobutylene and cyclopentadiene and in some cases isoprene also, were polymerized in the presence of an appropriate quantity of methylcyclohexane (MCH) cosolvent. The polymerizations were initiated using an 0.061 M solution of ethylaluminum dichloride (EADC) in MCH (volume measured at 25° C.) added at a rate such as to maintain the reactor temperature to within 2° C. of the indicated polymerization temperature. In some instanes small quantities of an 0.031 M solution of HCl in MCH (volume measured at −78° C.) were added to the reactor where the HCl serves as a cocatalyst for the polymerization. All polymerization were conducted in a dry inert atmosphere. The reactions were carried out for the indicated time period at which time they were terminated by the addition of a small quantity of cold 10% propanol in pentane. The reactor solutions were then treated briefly with gaseous $NH_3$ and coagulated by pouring them into hot methanol containing an antioxidant. Polymer samples were dried in vacuo at about 60° C. Polymerization details for some representative products are presented in Table I.

stance for two copolymers and one terpolymer composition are given as follows:

TABLE I
ISOBUTYLENE-CPD COPOLYMERS AND ISOBUTYLENE-ISOPRENE-CPD TERPOLYMERS

| # | Product Mole % Unsat. | Mn x $10^{-3}$ | Feed (ml) Isobutylene | CPD | Iso-prene | Cosolvent[a] | Temp. (°C.) Initial | Final | Time (min) | Polymer Yield(g) | Catalyst ml EADC in MCH 0.061M | Catalyst (ml) HCl in MCH 0.0315 M |
|---|---|---|---|---|---|---|---|---|---|---|---|---|
| 24 | 11.5[b] | 65 | 3104 | 96 | — | 800 | −100 | −100 | 45 | 103 | 200 | — |
| 36 | 15.5 | 82 | 3104 | 96 | — | 800 | −106 | −106 | 35 | 79 | 250 | — |
| 55 | 25.1 | 68 | 3040 | 160 | — | 800 | −100 | −100 | 50 | 105 | 300 | — |
| 58 | 27.1 | 80 | 3040 | 160 | — | 800 | −110 | −110 | 50 | 145 | 200 | — |
| 76 | 28.0 | 48 | 3040 | 160 | — | 800 | −95 | −94 | 60 | 127 | 150 | 11 |
| 77 | 14.6 | 40 | 3104 | 96 | — | 800 | −93 | −92 | 50 | 110 | 150 | 15 |
| 78 | 24.4 | 39 | 3230 | 170 | — | 600 | −90 | −89 | 50 | 105 | 150 | 11 |
| 79 | 16.4 | 36 | 3929 | 102 | — | 600 | −89 | −88 | 45 | 100 | 150 | 11 |
| 84 | 13.1 | 60 | 3104 | 96 | — | 800 | −107 | −107 | 35 | 113 | 100 | 10 |
| 120-2 | 33.7 | 65 | 736 | 64 | — | 200 | −90 | −90 | 80 | 40 | 80 | 15 |
| 121-1 | 21.6 | 90 | 760 | 40 | — | 200 | −111 | −110 | 28 | 20 | 20 | 0.5 |
| 26 | 9/17.8[c] | 86 | 2784 | 96 | 320 | 800 | −100 | −99 | 70 | 154 | 215 | — |
| 54 | 8/12 | 83 | 2816 | 64 | 320 | 800 | −109 | −109 | 68 | 109 | 250 | — |
| 57 | 7/11 | 49 | 2816 | 64 | 320 | 800 | −102 | −101 | 70 | 110 | 200 | — |
| 23 | 8.3/15.8 | 91 | 2784 | 96 | 320 | 800 | −110 | −109 | 35 | 57 | 200 | — |

[a]Cosolvent-methylcyclohexane (MCH)
[b]Mole % CPD in copolymer
[c]Mole % isoprene/mole % CPD terpolymer

| Cyclopentadiene Copolymer 19.1% Unsat. 55 000 $\overline{M}n$ | | Isoprene Copolymer 14.2% Unsat. 80 000 $\overline{M}n$ | | Isoprene/Cyclopentadiene Terpolymer 7.1/16.6% Unsat. 91 000 $\overline{M}n$ | |
|---|---|---|---|---|---|
| $v \times 10^4$ | TS, MPa[a] | $v \times 10^4$ | TS, MPa | $v \times 10^4$ | TS, MPa |
| 0.80 | 5.50 | 0.45 | 3.50 | 0.95 | 10.5 |
| 1.35 | 12.0 | 1.00 | 12.5 | 1.75 | 16.0 |
| 2.00 | 13.5* | 1.20 | 12.5* | 1.95 | 16.3* |
| 2.90 | 11.5 | 1.85 | 10.5 | 2.50 | 16.0 |
|  |  |  |  | 3.40 | 14.0 |

[a]1 MPa = 145.0 psi.
v Crosslink density (moles/cm³) - Reference 1.
*Maximum attainable tensile strength.
TS Tensile strength measured at ~23C, with a rate of extension of 20 inches/min.

EXAMPLE 2—MAXIMUM ATTAINABLE TENSILE STRENGTH

The maximum attainable tensile strength for a given elastomer with a given number average molecular weight in a given compound formulation is determined as follows. After selection of a suitable curing temperature, one vulcanizes the compound at several varying times of curing. Tensile strengths and crosslink densities[1] are measured on the resultant samples. The direction in which the level of the tensile strength trends with changing crosslink density is noted. Further curing times are then employed to allow amplification of the trend until a maximum in the tensile strength level is obtained. This is the maximum attainable tensile strength for the material in question[2]. The strength is dependent on the number average molecular weight of the original polymer and the crosslink density of the specific vaulcanizate. The crosslink density is virtually independent of the choice of curing temperature provided extreme high temperatures and extreme duration of curing times are avoided. Such extremes can lead to a reversion in the crosslinking resulting ultimately in a process of "devulcanization".

1. P. J. Flory and J. Rehner, J. Chem. Phys., 11, 512, 521 (1943). 2. P. J. Flory, Ind. Eng. Chem., 38, 417 (1946).

Some examples of the data developed to appraise the maximum attainable tensile strength in the present in- This method was utilized to determine the maximum tensiles for the various types of co- and terpolymers as a function of unsaturation and $\overline{M}n$. The data are presented in FIGS. VI, VII and VIII.

The compound formulation used to prepare the vulcanizates for test of these experimental elastomers was as follows: polymer 100, zinc stearate 1.65, HAF carbon black 60, hydrocarbon plasticizer oil (Flexon 845, ASTM Type 4) 20, antioxidant (Thermaflex A) 1.11, zinc oxide 5, sulfur 2.5, sulfenamide accelerator (Santocure NS) 0.75. For the compositions containing the "crosslinkable polyisobutylenes" (i.e., the isoprene copolymers with unsaturations in the range of the Butyl rubbers—1.19 to 2.68 mole percent) the formulation was modified with respect to the curative system. The accelerator (Santocure NS) was replaced by the ultra-accelerator combination, Tellurac plus Altax, both at 1.0 phr. The sulfur content was reduced to 1.5 phr. These modifications were in keeping with the reduced crosslinking capabilities of the indicated isoprene copolymers.

The compound formulation chosen for test of the experimental elastomers was selected on the basis that it represents a practical system with the added attractive economic and commercial feature of being relatively "extended" in terms of oil plasticizer and carbon black content. However, this test formulation can be varied quite broadly to achieve properties at specific levels related to some end use. Relative to the maximum attainable tensile strength, the trends that would be observed with changes in test formulations would be consistent with information well known in the art. Examples of such trends are given as follows. Changing the concentration of carbon black in either direction from the 60 phr level would entail a reduction in the tensile strength. Changing the type of carbon black would affect the tensile strength relative to the particle size of the black. A change to a carbon black of large particle size would result in a reduction in the tensile strength. A change to a carbon black of finer particle size would result in an increase in the tensile strength. Oil plasticizers of low to medium viscosity generally reduce tensile strength as the concentration is increased. Very viscous or resinous liquid materials in the formulation tend to increase the tensile strength. This is also true of resins. The curative system used for preparation of the vulcanizates can affect the maximum attainable tensile strength. As a broad general rule, the simpler the crosslink at the juncture point which results from a given curative system, the lower the tensile strength. Tensile strengths for example tend to increase as the bond simplicity decreases from C—C, C—S—C, C—$S_2$—C, C—$S_3$—C, etc. and $S_3+$. As practical examples, a peroxide cure would give a simple crosslink juncture (C—C). Next in line of reduced bond simplicity would be a single sulfur atom juncture ($S_1$) resulting from curing a formulation with relatively high accelerator and low sulfur contents. Conversely, curing with low accelerator and high sulfur contents results in a complex type of bond ($S_3+$).

Maxima in curves relating tensile strength to crosslink density are evident in the results of Gee[3], Flory, Rabjohn and Shaffer[4] and Dudek and Bueche[5].

[3]. G. Gee, J. Polymer Sci., 2, 451 (1947). [4]. P. J. Flory, N. Rabjohn and M. C. Shaffer, J. Polymer Sci., 4, 435 (1949). [5]. T. J. Dudek and F. Bueche, J. Appl. Polymer Sci., 8, 555 (1964).

Since many modifications and variations of this invention may be made without departing from the spirit or scope of the invention thereof, it is not intended to limit the spirit or scope thereof to the specific examples thereof.

What is claimed is:

1. A vulcanizable composition which comprises:
   (a) a substantially gel free copolymer consisting of a major portion of an isoolefin having about 4 to about 10 carbon atoms and about 8 to about 45 mole % of one cyclic conjugated diene of about 5 to about 9 carbon atoms, wherein said cyclic conjugated diene is selected from the group consisting of cyclopendadiene and methylcyclopentadiene, said copolymer having an $\overline{M}n$ of about 30,000 to less than 90,000;
   (b) a vulcanizing amount of sulfur donor; and
   (c) a delayed action accelerator.

2. A vulcanizable composition which comprises:
   (a) a substantially gel free terpolymer consisting of a major portion of an isoolefin having about 4 to about 10 carbon atoms and a minor portion of an acyclic conjugated diene having about 5 to 7 carbon atoms and a cyclic conjugated diene having about 5 to about 9 carbon atoms, said cyclic conjugated diene being selected from the group consisting of cyclopentadiene and methylcyclopentadiene, a mole % unsaturation of said cyclic conjugated diene being at least 8 mole %, an $\overline{M}n$ of said terpolymer being about 30,000 to less than 90,000;
   (b) a vulcanizing amount of sulfur donor; and
   (c) a delayed action accelerator.

3. A composition according to claims 1 or 2, wherein said isoolefin is isobutylene, 2-methyl-1-butene, 3-methyl-1-butene or 4-methyl-1-pentene.

4. A composition according to claim 1, wherein said isoolefin is isobutylene and said cyclic conjugated diene is cyclopentadiene.

5. A composition according to claims 1 or 4, wherein said mole % unsaturation is at least 20% and said $\overline{M}n$ is about 30,000 to about 50,000.

6. A composition according to claims 1 or 4, wherein said mole % unsaturation is at least 15% and said $\overline{M}n$ is about 50,000 to about 60,000.

7. A composition according to claims 1 or 4, wherein said mole % unsaturation is at least 10 mole % and said $\overline{M}n$ is about 60,000 to about 70,000.

8. A composition according to claims 1 or 4, wherein said mole % is at least 8% and said $\overline{M}n$ is about 70,000 to less than 90,000.

9. A composition according to claim 2, wherein said isoolefin is isobutylene, said cyclic conjugated diene is cyclopentadiene and said acyclic conjugated diene is isoprene.

10. A composition according to claims 2 or 9, wherein a mole % unsaturation of said cyclic conjugated diene is at least 20 mole % and said $\overline{M}n$ is about 30,000 to about 50,000.

11. A composition according to claims 2 or 9, wherein a mole % unsaturation of said cyclic conjugated diene is at least 15% and said $\overline{M}n$ is about 50,000 to about 60,000.

12. A composition according to claims 2 or 9, wherein a mole % unsaturation of said cyclic conjugated diene is at least 10% and said $\overline{M}n$ is about 60,000 to about 70,000.

13. A composition according to claims 2 or 9, wherein said mole % unsaturation of said cyclic conjugated diene is at least 8% and said $\overline{M}n$ is about 70,000 to less than 90,000.

14. The composition of claim 1, or 2 wherein the delayed action accelerator is a benzothiazole sulfenamide present at about 0.5 to about 3 wt. % based on the polymer.

15. The composition of claim 1 or 2, wherein a retarder having a pKa value of less than 7 is incorporated therein.

16. The composition of claim 1 or 2, wherein an activator is included said activator being selected from the group consisting of:
   (1) oxides, hydroxides and alkoxides of metals of Groups IA and IIA of the Periodic Table of Elements; and
   (2) organic compounds having a pKa value of about 8 to about 14.

17. The composition of claim 15, wherein the retarder has a pKa value of about 3 to about 5.

18. The composition of claim 1 or 2, wherein the accelerator is N,N-diethylbenzothiazole-2-sulfenamide, N-tertiary butyl benzothiazole-2-sulfenamide, 2-(morpholino) benzothiazole-2-sulfenamide, N,N-diisopropyl benzothiazole-2-sulfenamide, N-cyclohexyl benzothiazole-2-sulfenamide, N-N-dicyclohexyl benzothiazole-2-sulfenamide, 2(2,6-dimethyl morpholino) benzothiazole sulfenamide or 2-piperidinyl benzothiazole sulfenamide.

19. The composition of claim 14, wherein the retarder is N-nitroso diphenylamine, N-cyclohexyl thiophthalimide, phthalic anhydride or salicyclic acid.

20. The composition of claim 16, wherein the activator is diphenyl quanidine, hexane-1-amine, sodium methoxide or MgO.

21. The composition of claim 1 or 2, wherein a retarder is included.

22. The composition of claim 1 or 2, further including a filler at about 5 to about 350 parts by weight per one hundred parts of said polymer.

23. The composition of claim 1 or 2, further including a non-polar process oil at about 5 to about 200 parts by weight based on one hundred parts by weight of said polymer.

24. The composition of claim 23, further including a filler at about 5 to about 350 parts by weight per one hundred parts by weight of said polymer.

25. The composition of claim 1 or 2, further including an ester plasticizer at a concentration level of about 5 to about 100 parts by weight of said polymer.

26. The composition of claim 25, further including a filler at about 5 to about 350 parts by weight per one hundred parts by weight of said polymer.

27. The composition of claim 1 or 2, further including a rubber at a concentration level of about 5 to about 900 parts by weight per one hundred parts by weight of said polymer, said rubber being selected from the group consisting of non-polar crystallizable rubbers, polar crystallizable rubbers, non-polar, non-crystallizable rubbers, and polar non-crystallizable rubbers.

* * * * *